Jan. 21, 1964   A. ROSENZWEIG   3,118,553
SHOPPING CART
Filed Dec. 18, 1961   4 Sheets-Sheet 1
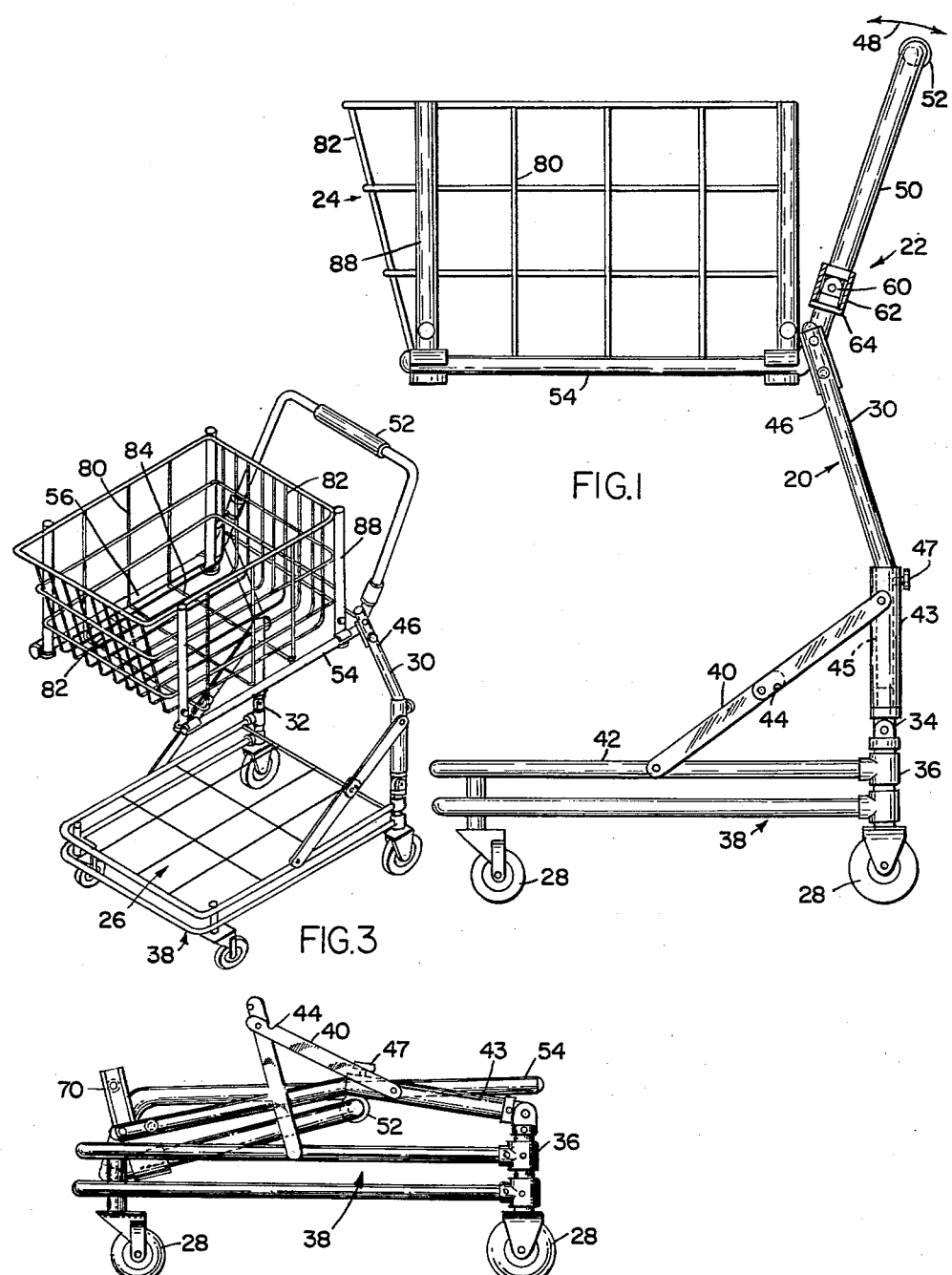
INVENTOR.
ADOLPH ROSENZWEIG
BY
Ezekiel Wolf, Wolf & Greenfield
ATTORNEYS Jan. 21, 1964  A. ROSENZWEIG  3,118,553
SHOPPING CART
Filed Dec. 18, 1961  4 Sheets-Sheet 2

INVENTOR.
ADOLPH ROSENZWEIG
BY
Ezekiel Wolf, Wolf & Greenfield
ATTORNEYS

Jan. 21, 1964   A. ROSENZWEIG   3,118,553
SHOPPING CART
Filed Dec. 18, 1961   4 Sheets-Sheet 3

INVENTOR.
ADOLPH ROSENZWEIG
BY
Ezekiel Wolf, Wolf & Greenfield
ATTORNEYS

Jan. 21, 1964 A. ROSENZWEIG 3,118,553
SHOPPING CART
Filed Dec. 18, 1961 4 Sheets-Sheet 4

INVENTOR.
ADOLPH ROSENZWEIG
BY
Ezekiel Wolf, Wolf & Greenfield
ATTORNEYS

United States Patent Office 3,118,553
Patented Jan. 21, 1964

3,118,553
SHOPPING CART
Adolph Rosenzweig, 1 Woodbourne Road,
Great Neck, Long Island, N.Y.
Filed Dec. 18, 1961, Ser. No. 159,856
5 Claims. (Cl. 214—501)

This invention comprises a new and improved shopping cart of the type having an elevated main carrying basket.

Generally, shopping carts used by customers in large markets are primarily intended for use within the market itself and include special features to facilitate storage and use within the store. While such carts may be used to convey the purchased goods of the customer from the store to the customer's automobile, they lack special features which enable the purchased goods to be transferred without lifting from the cart to the automobile. Furthermore, because the carts are the property of the store and are not ordinarily taken from the premises, they are not available to carry the purchased goods from the customer's automobile to his home when the customer has returned after shopping. Moreover, they include no special features which would enable the carts themselves to fit conveniently into a car for transportation to the home.

The primary object of this invention is to provide a shopping cart which may be wheeled about a store by a customer to carry the goods selected by him and which incorporates features that enable the customer to transfer the goods from the cart to an automobile without lifting them.

Another important object of this invention is to provide a shopping cart that may be fitted into an automobile and taken from place to place and used both at home and in the market while shopping.

A more specific object of this invention is to provide a shopping cart which enables the goods disposed in the cart to be readily transferred to and from the trunk of an automobile without requiring any lifting on the part of the user.

To accomplish these and other objects, the shopping cart of this invention includes a basket releasably carried by the cart frame. The basket has a number of telescoping legs each of which may be lowered to a supporting surface while the basket is carried on the frame. As another feature the cart is provided with means for regripping or reloading the basket on the frame when the basket is supported on the legs and detached from the frame. The frame itself is collapsible when the basket is removed so that it may fit conveniently into the trunk or passenger compartment of an automobile. The cart frame is so shaped that it may be wheeled to a position at the trunk of the automobile wherein the basket is disposed over the trunk floor. When the cart is so disposed, the basket legs may be released to support the basket on the trunk floor and thereafter the frame may sequentially be detached, withdrawn, collapsed, and placed in the trunk beside the basket.

These and other objects and features of this invention, along with its incident advantages, will be better understood and appreciated from the following detailed description of two embodiments thereof, selected for purposes of illustration and shown in the accompanying drawing, in which:

FIG. 1 is a side view of a shopping cart constructed in accordance with this invention;

FIG. 2 is a side view of the frame of the cart shown in FIG. 1 with the frame collapsed;

FIG. 3 is a perspective view of the cart shown in FIG. 1;

Figure 4:
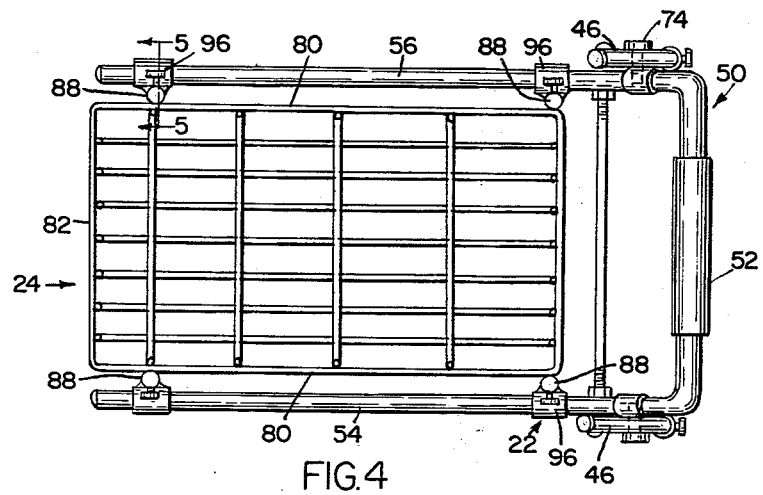
FIG. 4 is a top view of the cart.

The shopping cart shown in the drawing includes a frame 20 having a combination handle and carrying member 22, a basket 24, a lower shelf 26, and casters 28 enabling the cart to be wheeled from one location to another.

The frame 20 includes a pair of generally vertical tubular posts 30 and 32 pivotally secured by means of hinges 34 to the vertical members 36 forming part of the base frame 38 for the lower shelf 26. The posts 30 and 32 are each releasably secured in the position shown in FIG. 1 by a collapsible brace 40 fastened at one end to the middle of horizontal rail 42 of the base frame 38 and at the other end to the lower portion 43 of the post itself. The collapsible braces 40 are made up of two sections pivotally joined together at their adjacent ends and include a pin and slot stop 44 adjacent their pivotal junction to releasably hold the braces in their supporting positions. To collapse the posts 30 and 32 a force must be applied against each of the braces 40 in an upwardly direction causing the braces to fold in the manner suggested in FIG. 2.

It will be noted in FIG. 1 that the lower portion 43 of the posts 30 and 32 above the hinges 34 are tubular and telescopically receive the vertical portions 45 of the posts. A knurled-headed set screw 47 is shown in the figure which permits the owner to vary the height of the posts and thereby vary the height at which the basket 24 is carried on the frame. It is to be understood that other means may be used to so vary the height of the posts so long as they do not interfere with the necessary functions of the cart. The advantages of being able to adjust the basket height on the frame will be apparent from the following description.

The upper ends 46 of the posts 30 and 32 pivotally support the handle and carrying member 22 so that it may be moved back and forth in the arc suggested by arrow 48 in FIG. 1. The member 22 is made up of an inverted U-shaped handle 50 bearing grip 52 and a pair of generally L-shaped arms 54 and 56. Pivot pins 58 extend through the top 46 of the posts 30 and 32 and through the handle end of the horizontal arms 54 and 46 to provide the pivotal support recited. The handle 50 and the arms 54 and 56 are interconnected by hinge members 60 each surrounded by a sleeve 62. The hinge members 60 permit the handle 50 to be folded so that it lies generally in the plane of the arms 54 and 56. The sleeves 62 covering the hinges 60 are gravity biased to a lower position wherein they are supported on collar 64 on the arms 54 and 56, and to collapse the handle and carrying member 22 so that the handle 50 lies along the arms 54 and 56, the sleeves must be raised to expose the hinges. One or more cross braces 65 may serve to strengthen the member 22.

The handle ends of the arms 54 and 56 turn upwardly to form an angle of approximately 110° with the forward ends of the arms so that when the member 22 is in the position shown in FIG. 1 the handle 50 is slightly inclined toward the person pushing the cart.

Figure 7:
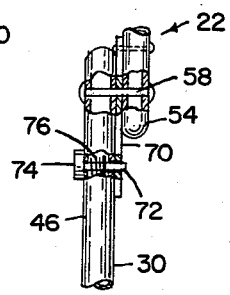
Figure 8:
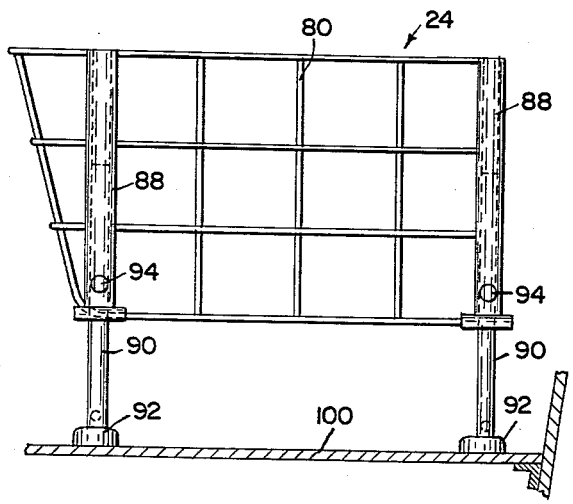
FIG. 8 is a side view showing the basket of the cart removed afrom the frme and independently supported by its own legs on a supporting platform.

To lock the handle and carrying member 22 in the position shown in FIG. 1 so that it is in a position to support basket 24, plates 70 are provided which extend downwardly from the bends in the arms 54 and 56 along the direction of the upper ends 46 of the posts 30 and 32. The plate 70 is shown in FIG. 7 to be disposed adjacent the upper end 46 of the post and is provided with an opening 72 that receives a pin 74 biased into the opening by spring 76. When the pin 74 on each post engages the opening 72, the handle member 22 is locked in the position shown in FIG. 1 with the arms 54 and 56 disposed in a horizontal plane. To release the member 22 so that it may be pivoted as suggested by arrow 48 about the pivot pins 58, each of the two pins 74 must be withdrawn from the openings 72 in the plates against the bias of the springs 76.

The basket 24 is wholly separate from the frame 20 and particularly its handle member 22. The basket is provided with generally conventional side, end and bottom wire walls 80, 82 and 84, respectively and is provided with four tubular legs 88 adjacent the corners of the basket. If the forward end of the basket is inclined slightly as shown in the drawing, the forward legs 88 are set somewhat back from the corners as is evident in several of the figures. Each of the tubular legs 88 includes a telescoping member 90 which bears a foot 92 at its lower end. The elevation of the telescoping members 90 within the tubular legs 88 is controlled by screws 94 threaded into the tubular members. The screws 94 bear against the inner telescoping members 90 and hold them at any selected elevation.

Figure 5:
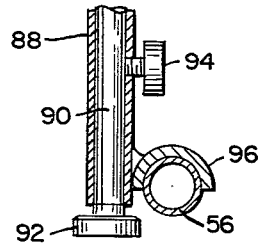
FIG. 5 is a cross sectional view taken along the corresponding section line in FIG. 4.
Figure 6:
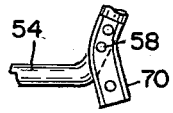
FIGS. 6 and 7 are fragmentary views of the frame and handle of the shopping cart.

Carried on the bottom ends of each of the legs 88 is an arcuate plate 96 that describes approximately 180° of arc and is of a radius to receive the horizontal arms 54 and 56 of the member 22. The manner in which the arcuate plates 96 rest upon the horizontal arms of the handle and carrying member 22 is clearly illustrated in FIG. 5. Thus, the basket 24 literally sits upon the arms 54 and 56 and may readily be removed from them without releasing any screws, pins, etc. Thus, the basket may be lifted from the handle member 22 or alternatively the basket may be deposited on a supporting surface and be removed from the member by pivoting the handle member counterclockwise as viewed in FIG. 1, made possible by withdrawing the pins 74 against the bias of the springs 76 from the openings 72 in the plates 70.

Figure 9:
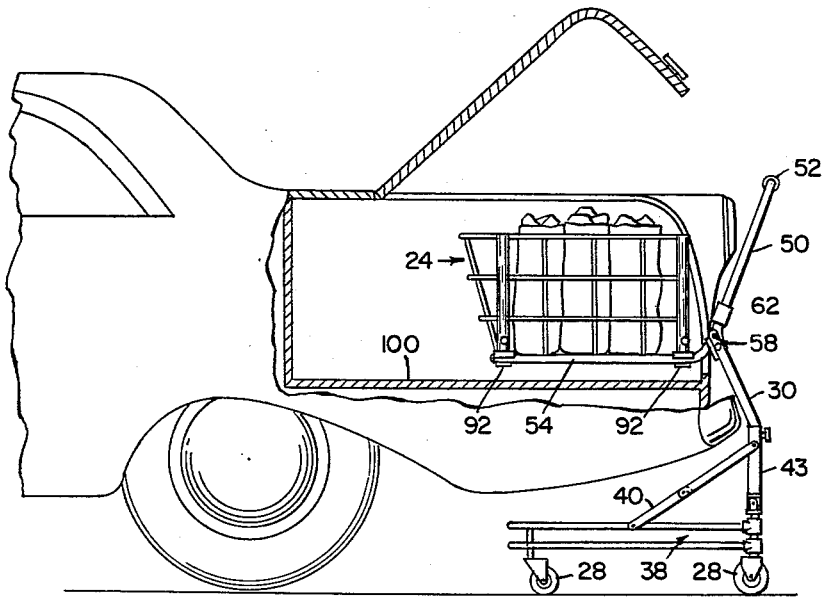
FIGS. 9 and 10 illustrate the manner in which the shopping cart may position and release its basket in the trunk of an automobile.

Having described in detail the several features of this invention, I shall now describe the manner in which it may be used by a shopper particularly in transferring bundles to and from his automobile. First, it will be appreciated that the cart may be used by the shopper in the market in place of the shopping cart ordinarily provided by the store. After selecting the items needed, they are conveyed in the cart to the checkout stand where they are removed for checking and then reloaded into the basket 24 of the cart. The shopper then wheels the cart to his automobile, opens the automobile trunk, and moves the cart to the position shown in FIG. 9. It will be noted that the posts 30 and 32 are slightly inclined in a forward direction to enable the basket 24 to be positioned above the floor 100 of the automobile trunk when the trunk lid is opened. The height of the posts 30 and 32 will have previously been adjusted by the screws 47 for the owners particular automobile so that the basket will just clear the rear panel of the trunk. Once adjusted, the height of the posts need not again be changed until the cart is to be used with another vehicle. The braces 40 are confined to the lower portion of the cart frame so that they do not interfere with the automobile bumper, and the lower portion 38 of the frame conveniently rolls under the rear of the car. When the loaded cart is positioned as shown in FIG. 9, the shopper then loosens the retaining screws 94 on each of the four legs so that the inner tubular members 90 drop until the feet 92 engage the floor 100 of the trunk. The legs are shown in this position in FIG. 10. When the feet 92 rest on the floor, the operator again tightens the screws 94 so that the legs may support the basket at the same elevation as the basket is supported by the arms 54 and 56 of the handle member 22. Next, the shopper pulls the pins 74 against the bias of their springs 76 to free the pins from the openings 72 in the plates 70 of the handle member. This action allows the handle member to tilt forwardly to the position shown in FIG. 10 and the cart may then be withdrawn from underneath the basket as suggested in that figure. The frame 20 and its handle member 22 is then collapsed to the form shown in FIG. 2 by elevating the sleeves 62 on the handle 50 and collapsing the braces 40. When so folded, the frame can be slipped into the passenger compartment or trunk beside the loaded basket.

Figure 10:
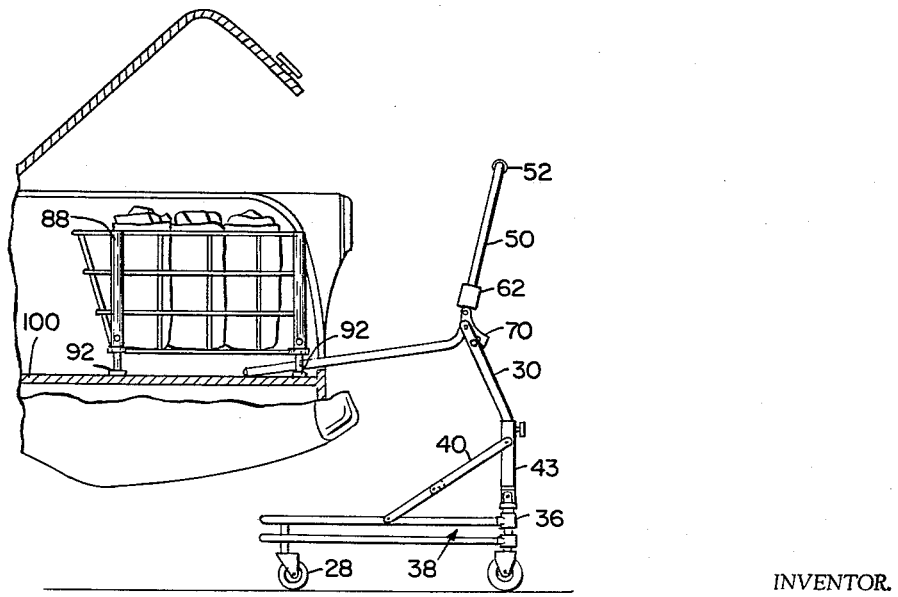

When the shopper desires to remove the loaded basket from the trunk when, for example, he or she returns home, this may be done by reversing the procedure described, and the shopper need not at any time physically lift the basket loaded with the purchased goods. First the shopper reassembles the frame by straightening the braces 40 and unites the arms 54 and 56 with the handle 50 by means of the sleeves 62. Merely by straightening the handle 50 the sleeves 62 under the influence of gravity fall to the collar 64 and cover the hinge members 60 to retain the handle and carrying member 22 in its rigid form. After this is done, the shopper moves the frame 20 to slip handle arms 54 and 56 under the basket supported on the legs 88 in the trunk. When the arms 54 and 56 lie beneath the arcuate plates 96 on the sides of the legs, the shopper pivots the handle member 22 clockwise as shown in FIG. 10 and allows the pins 74 to reenter the holes 72 in the plates 70 so that the handle member is locked in position. The frame 20 and handle member 22 then provide full support for the basket, and the members 90 may be retracted in the tubular legs 88 by loosening the screws 94, raising the members 90 and retightening the screws. When this is done the cart can be wheeled away from the automobile and convey the loaded basket 24 into the home.

Figure 11:
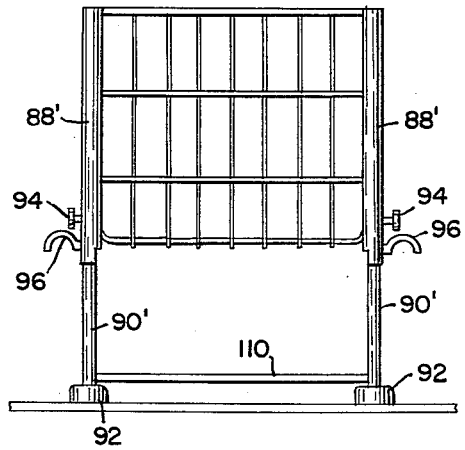
FIG. 11 is an end view of the basket showing a modification of this invention.

In the embodiment of FIG. 11 the front and rear pairs of legs 88' are connected together by a brace 110 which spans the members 90' so that the legs may be moved in pairs more quickly by the user. It will be noted that the brace is secured between the pair of legs illustrated and does not interfere with the raising and lowering of those legs. While I have shown in that figure separate screws 94 for tightening the legs in either a raised or lowered position, it is to be understood that a single fastening device could be used for this purpose and that it could engage the brace 110 rather than the legs. It will also be understood that the brace 110 could span the members 90' at their tops, and slots could be provided in the tubular portions to permit it to lower with the members 90' to support the basket on a platform. Moreover, the braces could connect the two left and the two right legs rather than the front and rear legs as shown. This alternative arrangement would make it easier for the user to handle the braces by eliminating the need to reach over to the front of the cart.

Figure 13:
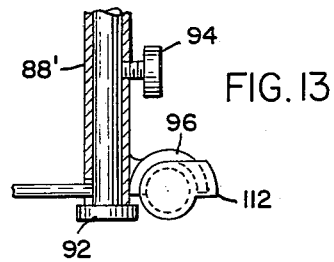
FIG. 13 is a cross sectional view of a portion of the modification shown in FIG. 12.
Figure 12:
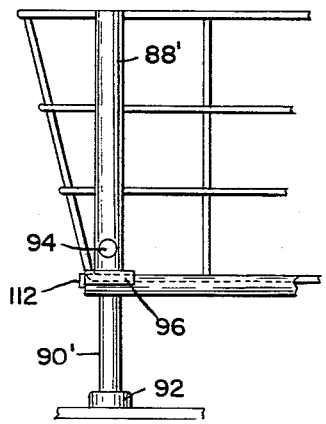
FIG. 12 is a fragmentary side view of another modification of this invention.
Figure 14:
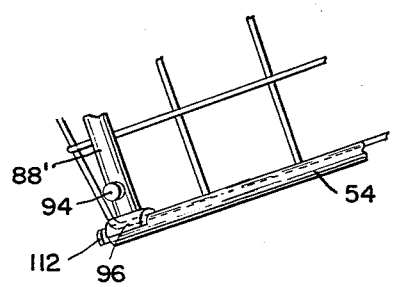
FIG. 14 is a fragmentary side view illustrating the function performed by the modification of this invention shown in FIGS. 12 and 13.

In the embodiment of FIGS. 12–14, lugs 112 are provided at the free ends of each of the arms 54 and 56 of the member 22. The lugs 112 serve to retain the arcuate plates 96 of the basket on those arms even when the cart is tilted sharply as suggested in FIG. 14. The lugs 112 will not interfere with the withdrawal of arms from the plates 96 when the basket is supported on its own legs as the arms are tilted downwardly as shown in FIG. 10 when the basket is detached from the cart frame. It is to be expressly understood that other fasteners or keepers could be employed to perform the same function.

Having described my invention in detail, it will be appreciated that its several features may be incorporated into other shapes and varieties of shopping carts to equal advantage. For example, the features of this invention may be incorporated into telescoping-type shopping carts of the kind having baskets which are tapered from front to rear and which have pivotally movable rear walls so that the basket of one cart may slip within the basket of another. Such carts also have tapered lower racks and inclined shelves at their bottom which enable the carts to fit telescopically within one another to reduce the area required for storage. The features of this invention are clearly compatible with shopping carts having such well known characteristics. It will also be appreciated that modifications may be made of this invention without departing from its spirit. Therefore, I do not intend to limit the breadth of this invention to the specific embodiments illustrated and described. Rather, it is my intention that the breadth of this invention be determined by the appended claims and their equivalents.

What is claimed is:

1. A shopping cart comprising a frame including a pair of supporting posts,
   a handle member mounted on the top of the posts and having a pair of generally horizontal arms extending forwardly of the posts,
   a basket having a plurality of plates adapted to sit upon the arms and support the basket on the frame,
   means extendable downwardly from the basket to support the basket at the height at which it is carried by the frame independently of the frame whereby the arms may be removed from under the plates of the basket and disengage the basket,
   and means pivotally interconnecting the handle member and the posts enabling the handle member to be moved under and thereafter raised beneath the basket to position the basket with the plates on the arms.

2. A shopping cart as defined in claim 1 further characterized by the said frame being collapsible.

3. A shopping cart as defined in claim 2 further characterized by the posts being of variable height to support the arms at selected elevations.

4. A shopping cart comprising a frame including a pair of supporting posts,
   a handle member secured to the posts for pushing the cart and having a pair of arms extending forwardly of the posts,
   a basket adapted to be carried by the arms,
   means extendable downwardly from the basket to support the basket at the height at which it is carried by the frame independently of the frame whereby the arms may disengage the basket,
   and means including a pivotal connection between the handle member and the post enabling the arms to be positioned beneath the basket and raised to engage the basket upon pivotal movement of the handle member so that the arms support the basket.

5. A shopping cart comprising
   a frame having a lower shelf supported on a plurality of wheels to enable the cart to be rolled about by a shopper,
   a pair of posts extending upwardly from the rear side of the lower shelf,
   a handle member mounted on the top of the posts and having a pair of generally horizontal arms extending forwardly of the posts above the lower shelf and a handle extending rearwardly and upwardly of the posts,
   a basket having a plurality of plates adapted to sit upon the arms and support the basket on the frame,
   legs mounted on and extendable downwardly from the basket to support the basket at the height at which it is carried by the frame independently of the frame whereby the arms may be removed from under the plates of the basket and disengage the basket,
   means including a pivotal connection between the handle member and the posts enabling the arms to be positioned beneath the basket and raised to engage the plates upon pivotal movement of the handle member so that the arms support the basket,
   and means for collapsing the handle member and the posts to enable the frame to be folded for compact storage.

References Cited in the file of this patent

UNITED STATES PATENTS

| | | |
|---|---|---|
| 1,964,273 | Remde | June 26, 1934 |
| 2,147,522 | Byington | Feb. 14, 1939 |
| 2,284,801 | Conger | June 2, 1942 |
| 2,422,862 | Stottrup | June 24, 1947 |
| 2,665,938 | McCrossen | Jan. 12, 1954 |
| 2,985,482 | Lion | May 23, 1961 |
| 2,995,397 | Eames | Aug. 8, 1961 |